Patented Sept. 22, 1942

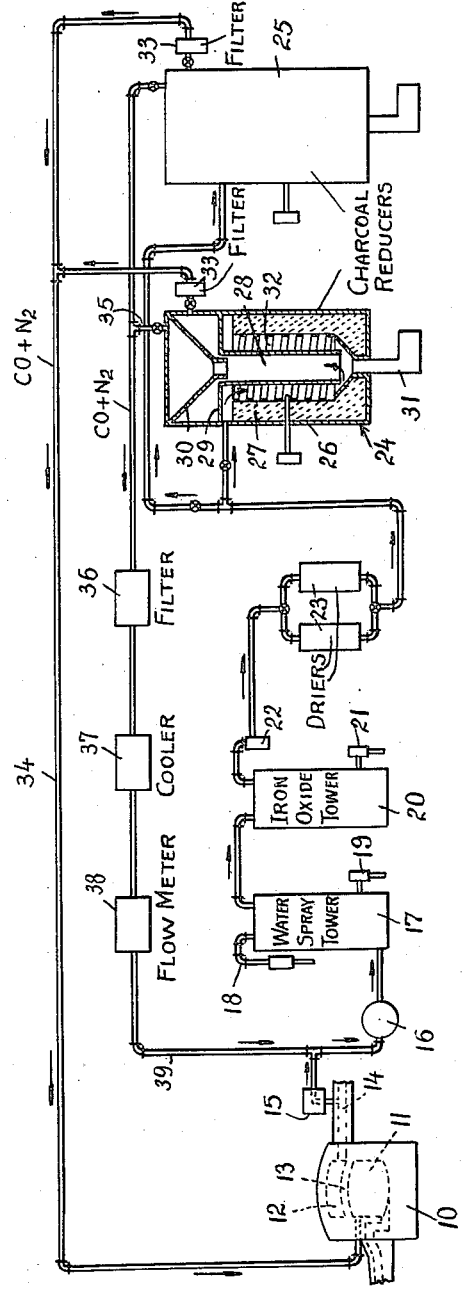

2,296,434

UNITED STATES PATENT OFFICE 2,296,434

PRODUCTION OF GASES FOR METALLURGICAL AND LIKE OPERATIONS

Robert A. Ghelardi and Philip M. Hulme, Metuchen, N. J., assignors to International Smelting and Refining Company, a corporation of Montana Application December 20, 1940, Serial No. 370,956

8 Claims. (Cl. 75—96)

This invention relates to the production of gases for metallurgical and like operations, and relates more particularly to the production of carbon monoxide-bearing gas suitable for use as a non-oxidizing or reducing atmosphere in metallurgical operations. The invention has for its principal object to provide an improved and economical method for the production of a gas consisting essentially of carbon monoxide and nitrogen.

Certain types of chemical and metallurgical operations must be carried out in a non-oxidizing and preferably reducing atmosphere which is substantially free of contaminants capable of reacting with the material being treated. For example, certain metallurgical operations performed on copper at elevated temperatures require the provision of an atmosphere which is free of oxidizing impurities capable of oxidizing the hot copper, free of reducing impurities capable of being absorbed by the hot copper, and free of other impurities capable of reacting with or otherwise acting disadvantageously on the hot copper. Operations of this character are described in our co-pending application Serial No. 362,956, filed October 26, 1940, relating to an improved method for melting copper, and in our co-pending application Serial No. 363,518, filed October 30, 1940, relating to an improved method for the production of flat-set copper.

Operations of the character described in our aforementioned co-pending applications are best carried out in a gas atmosphere consisting essentially of carbon monoxide and nitrogen. Methods for producing such a gas have been known for many years. These methods generally follow the well-known procedures for manufacturing of producer gas. Generally speaking, the methods heretofore known for producing a substantially pure nitrogen-carbon monoxide gas involve burning a fuel, preferably a gaseous fuel which is substantially free of undesirable impurities, with air under carefully controlled conditions. A gaseous fuel commonly is employed because combustion of a gas is much more easy to control than is combustion of other fuels to form combustion products of uniform composition. The combustion products resulting from combustion of the fuel gas are subjected to well-known gas purification treatments to remove sulphur dioxide, hydrogen sulphide, water vapor and other undesirable impurities. The purified gas is then passed at an elevated temperature in contact with dry charcoal or other relatively pure form of carbon to reduce the carbon dioxide contained in the gas to carbon monoxide and thus to form a gas consisting substantially entirely of carbon monoxide and nitrogen.

A distinct handicap to commercial practice of such methods is the need for burning fuel gas especially to provide the combustion gases from which the final gas product is made. The cost of the fuel gas is a factor of some importance, especially since no provision ordinarily is made to untilize its heat of combustion. To make such provision would in many instances seriously interfere with the production of combustion gases of the required uniform composition. Uniform composition of the combustion gases has been required in order to insure production of a carbon monoxide-nitrogen gas of uniform quality. Moreover, almost theoretically perfect combustion of the fuel gas has been necessary so as to form combustion gases free of any substantial amount of excess oxygen and free also of incompletely burned fuel, especially incompletely burned hydrocarbons. The latter are objectionable because of the difficulty of removing them from the combustion gases without admitting oxygen to burn them, and if this is done an excess of oxygen is unavoidably added to insure their complete oxidation. Any substantial excess of oxygen (more than a few tenths of one per cent) is objectionable for the reason that such oxygen, upon combining with the charcoal or other carbonaceous reducing agent, produces an undesirably high temperature in the charcoal reduction chamber. Such high temperatures cause the ash of the charcoal or other fuel to fuse, impeding effective operation of the apparatus and adding greatly to maintenance and operating expenses. Operating expenses in such a case are increased by the need for frequent cleaning of the combustion chamber to remove fused or clinkered ash, and maintenance expenses are increased because parts of the reduction apparatus are corroded by the fused ash and must be replaced at frequent intervals.

The present invention provides an improved method for the production of a gas consisting essentially of carbon monoxide and nitrogen, which method avoids the disadvantages encountered in following heretofore known procedures. In a preferred embodiment of the invention to provide a gaseous atmosphere for the laboratory of a fuel-fired furnace having a combustion chamber separated from the laboratory, the invention contemplates employing combustion gases from the combustion chamber of the furnace as the raw gas from which the laboratory atmosphere gas is made. A portion of the combustion gases is withdrawn from the combustion chamber and is treated to remove impurities and to form a gas consisting essentially of carbon monoxide and nitrogen. The gas thus formed is introduced into the furnace laboratory to provide the required atmosphere. Utilization of the combustion gases from the combustion chamber as the raw gas from which the laboratory atmosphere gas is made eliminates the need for separately and carefully burning a selected fuel to provide such raw gases.

In order to overcome the deleterious effect of the free oxygen that is generally present in ordinary combustion gases, a gas comprising a gaseous substance capable of combining with oxygen is admixed with the combustion gases after their withdrawal from the furnace combustion chamber. The resulting gas mixture is heated prior to reduction of the carbon dioxide to carbon monoxide in order to convert the free oxygen originally present in the combustion gases to a compound of oxygen by reaction with the admixed gaseous substance. In the preferred practice of the invention, a portion of the carbon monoxide-bearing gas withdrawn from the carbon dioxide reduction operation is employed as the gas admixed with the combustion gases.

A generally preferred and generally complete embodiment of all of the features of the invention in the operation of a fuel-fired furnace having a combustion chamber separated from a laboratory, involves providing a gaseous laboratory atmosphere consisting essentially of carbon monoxide and nitrogen by first withdrawing from the combustion chamber of the furnace a portion of the combustion gases composed of carbon dioxide, nitrogen, and impurities including oxygen and water vapor. A gas comprising carbon monoxide is admixed with the withdrawn combustion gases, and the resulting gas mixture is treated to remove water vapor. The dry gas mixture is then heated to convert the oxygen which it contains to carbon dioxide by reaction with the added carbon monoxide. Thereafter the gas is passed in contact with charcoal at an elevated temperature in a reduction chamber to reduce the carbon dioxide to carbon monoxide and so to form a gas consisting essentially of carbon monoxide and nitrogen. A minor portion of the hot gas from the reduction chamber is passed in contact with charcoal about to be charged into the reduction chamber in order to dry such charcoal and so avoid contaminating with water vapor the gas reduced by such charcoal. The somewhat moist gas from the charcoal-drying operation is employed as the carbon monoxide-bearing gas admixed with the combustion gases as they are withdrawn from the furnace combustion chamber. The major portion of the gas from the charcoal reduction chamber is introduced into the laboratory of the furnace to provide therein the desired gaseous atmosphere.

The invention will be better understood from the following description considered in connection with the accompanying drawing, which shows diagrammatically an arrangement of apparatus suitable for use in commercial practice of the invention.

The apparatus shown in the drawing includes a fuel-fired muffle furnace 10 having a laboratory 11 separated from a combustion chamber 12 by a refractory arch 13. Fuel oil or other readily available fuel is burned in the combustion chamber 12, and control of such combustion may be governed solely in accordance with the requirements of economical combustion and furnace operation, and without regard to the composition of the combustion gases. In order to provide a gaseous atmosphere consisting essentially of carbon monoxide and nitrogen for the furnace laboratory 11, a portion of the combustion gases passing from the combustion chamber 12 through a flue 14 is withdrawn from the flue through a water chamber 15 by a pump 16. The water chamber 15 serves primarily to cool the withdrawn combustion gases preparatory to treatment.

The cooled gases are delivered by the pump to the base of a water spray tower 17, to which a spray of water is delivered through a conduit 18 and from which water is withdrawn through a trap 19. In passing through the water spray tower 17 the combustion gases are scrubbed to remove dust and soot, and at the same time any sulphur dioxide present is washed from them. The water spray tower may be of more or less conventional construction.

The gases emerging from the water spray tower 17 pass next to an iron oxide tower 20 in which a charge of wood chips or other suitable carrier impregnated with iron oxide is maintained. Hydrogen sulphide is removed from the gases in the course of their passage through the iron oxide tower. This tower as shown in the drawing is provided with a trap 21 through which water collecting in the tower may be withdrawn. In general the construction of the tower 20 may follow the conventional construction of such apparatus for gas purification.

The gas passes from the iron oxide tower through a moisture trap 22 in which most remaining droplets of moisture are separated. Thence the gas passes to one of two electro-driers 23. The driers 23 are filled with activated alumina which has the capacity of removing the last of the water vapor and moisture in other forms from the gases. Each of the driers is equipped to be heated electrically to dry and thus regenerate the alumina after it has become substantially saturated with moisture. A pair of driers are provided so that one may be used to dry the gas while the other is being regenerated.

From the driers 23 the gas passes to one of two charcoal reducers 24 or 25. A pair of charcoal reducers 24 and 25 are provided so that one may be employed in the treatment of the gas while the other is being cleaned and recharged with charcoal. The charcoal reducers 24 and 25 are both of the same construction, and accordingly only the left-hand reducer 24 is shown in the drawing in diagrammatic section.

The charcoal reducers each comprise a metal shell 26 in which is mounted an insulating lining 27. A tube 28 of nichrome or other refractory metal alloy is arranged substantially centrally within the lined portion of the reducer and is held in place by a flange 29 of nichrome or other refractory metal alloy. This arrangement provides an annular gas heating space between the lining 27 and the refractory metal tube 28. A charge of charcoal or other substantially pure form of carbon fills the tube 28. A hopper 30 in the upper portion of the reducer provides storage space for charcoal about to be charged into the tube 28. A clean-out conduit 31 is provided for the removal of ash from the reducer. An electric resistance heating element 32 is wound spirally against the inner surface of the lining 27 for heating both the charge of charcoal within the tube 28 and the annular gas space.

The gas entering the reducer is introduced into the space between the flange 29 and the top of the lining 27, and thence passes downwardly through the annular gas heating space between the lining 27 and the refractory tube 28. In the course of its passage through this annular space the gas is heated to an elevated temperature. Upon reaching the bottom of the annular heating space, the gas turns upwardly and passes through the charge of hot charcoal maintained within the tube 28. The temperature of the charcoal in the tube should be held fairly constant within the range of 1900° F. to 2000° F. A temperature of this magnitude is necessary to insure complete reduction of the carbon dioxide, but higher temperatures should be avoided in order to insure against fusion of the quite readily fusible charcoal ash. In the course of passage of the gas in contact with the charcoal, the carbon dioxide is reduced to carbon monoxide, thereby producing a gas consisting essentially of carbon monoxide and nitrogen.

A major portion of the carbon monoxide-nitrogen gas passes through the space between the hopper 30 and the flange 29, and from this space is withdrawn through a valved conduit to a filter 33. The filter serves to remove the small amount of dust picked up by the gas in the course of its passage through the charcoal. From the filter 33 the gas is passed through a conduit 34 to the laboratory 11 of the furnace 10, and provides therein an atmosphere of carbon monoxide and nitrogen which is substantially free of impurities. If desired, a gasometer for gas storage purposes may be included in the conduit 34 to accommodate irregularities in the volume of gas production or use.

A minor portion of the hot carbon monoxide-nitrogen gas passing from the tube 28 of the charcoal reducer enters the hopper 30 and there comes in contact with the charcoal about to be charged into the tube 28. This hot gas serves to dry the charcoal in the hopper, so that only dry charcoal can enter the tube 28. If hydrogen or water vapor constitute objectionable impurities in the carbon monoxide gas, as they do in gas atmospheres for copper melting operations of the character described in our aforementioned co-pending applications, then it is important that the charcoal introduced into the tube 28 be dry so as to avoid contaminating with these impurities the carbon monoxide gas produced in the reducer.

The minor portion of hot gas employed to dry the charcoal in the hopper 30 is withdrawn through a valved conduit 35 and is passed in series through a filter 36 to remove dust, a cooler 37 to cool the gas, and a flow meter 38. From the flow meter this minor portion of gas is passed through a conduit 39 to the intake of the pump 16, where it is admixed with combustion gases freshly withdrawn from the furnace combustion chamber 12. The carbon monoxide in the gas thus added to the combustion gases serves the important function of combining with any free oxygen in the combustion gases to form carbon dioxide before the combustion gases come in contact with the charcoal in the reducer 24 or 25. A sufficient amount of the carbon monoxide-bearing gas should be added to the combustion gases so as to insure substantially complete removal of free oxygen. The actual amount of carbon monoxide added to the combustion gases may be varied from time to time in accordance with the composition of the combustion gases, or a substantially constant amount of the carbon monoxide gas, sufficient to insure elimination of the maximum amount of oxygen ever present in the combustion gases, may be added continuously.

As the gases enter the reducer and pass into the hot upper portion of the annular gas heating space, any uncombined oxygen present combines with the added carbon monoxide to form carbon dioxide. The gas reaching the bottom of the annular heating space and coming into contact with charcoal at the bottom of the nichrome tube 28 therefore contains no free oxygen. The importance of this method of operation is that development of excessively high temperatures at the bottom of the tube 28 is avoided. If any uncombined oxygen should be present in the gases coming in contact with the hot charcoal of the bottom of the tube 28, the exothermic reaction between such oxygen and the charcoal would result in the development of excessively high temperatures at this point. The temperatures so produced are high enough to cause the ash present in the charcoal to fuse and partially to plug the rather narrow passage from the annular gas heating space into the tube, thus seriously impeding normal flow of gas through the reducer. Moreover, charcoal ash is high in caustic potash, and the fused ash is consequently highly corrosive even to refractory metal alloys such as nichrome. The formation of considerable amounts of fused ash at the bottom of the nichrome tube 28 will, in a short period of time, so damage this tube as to necessitate its replacement.

Combustion of the carbon monoxide with the uncombined oxygen in the upper portion of the annular gas heating space is not objectionable because this portion of the reducer is kept relatively cool by the endothermic reduction reaction proceeding within the tube 28. Further, the combustion of carbon monoxide with oxygen to produce carbon dioxide liberates less heat than the combustion of oxygen with carbon to form carbon dioxide, and it is the latter reaction which probably first occurs when free oxygen in the gases come in contact with the charcoal (the carbon dioxide formed in such a case is reduced to carbon monoxide higher up in the tube 28). Moreover, combustion of the oxygen with the carbon monoxide in the upper portion of the gas heating space is not localized to the extent that it would be localized if it occurred at the point where the gas from the annular heating space comes in contact with the charcoal. Finally only a very small amount of ash is present in the upper portion of the tube 28, so that relatively little damage could be done by temperatures high enough to fuse ash in this zone.

As a result of the above-described method of operation involving mixing with the combustion gases enough of the gas from the charcoal reducer to provide sufficient carbon monoxide to combine with all of the free oxygen present, maintenance and operating expenses of the charcoal reducers are very much decreased. For example, in the operation of apparatus arranged substantially as shown in the drawing, but without introducing any gas to combine with the free oxygen present in the combustion gases, the high temperatures developed at the point where the gases came in contact with the charcoal resulted in development of fused charcoal ash in the pit of the reducer at such a rate that it became necessary to shut down the reducer and clean out the fused or clinkered ash as frequently as eight to ten times within a period of twenty-four hours. The fused ash caused such damage to the nichrome tube in the reducer as to require replacement of this part at intervals as short as two months. Upon modifying operation of the apparatus to the extent of mixing carbon monoxide gas from the reducer with the combustion gases in the manner described, it became unnecessary to clean out ash from the reducer more often than once a day. Even this clean-out was precautionary rather than necessary, for the ash was unfused and of light, powdery quality. At the same time, the life of the nichrome tube in the reducer was very greatly prolonged, corrosion of the tube being negligible even after several months of continuous operation.

Although it is preferred, as described above, to employ for admixture with the combustion gases the minor portion of carbon monoxide gas used to dry the charcoal, it is of course understood that a portion of the dry gas product of the reducer may be employed exclusively for this purpose, or a portion of such dry gas may be employed to supplement the gas from the charcoal-drying operation. Other gases than carbon monoxide capable of combining with oxygen, such, for example, as hydrogen, may be admixed with the combustion gases containing free oxygen to obtain the operating benefits resulting from the use of carbon monoxide in the manner described. If such other gas is employed, however, it should be a gas of such character that an excess may be readily removed from the combustion gases, or it must be of such character that the excess necessarily added to the combustion gases is not objectionable in the use to which the final gas product is put.

The method of the invention as herein described has been used successfully in the production of a carbon monoxide gas containing about 73% nitrogen and about 27% carbon monoxide, with only negligible quantities of impurities, from fuel oil combustion gases analyzing about 12 to 15% carbon dioxide, 2 to 10% water vapor, variable amounts of oxygen from 0.1 to 5%, about 79% nitrogen, and small amounts of such impurities as sulphur dioxide and hydrogen sulphide. The fuel oil combustion was regulated in accordance with the usual careful commercial practice to secure most economical combustion, but it was impossible to avoid occasional rather wide variations in the composition of the combustion gases, particularly with reference to its oxygen content. Notwithstanding such wide variations in composition of the raw combustion gases, the carbon monoxide-nitrogen gas product was readily maintained of uniform composition and high quality.

From the foregoing it is apparent that the invention provides an efficient and relatively inexpensive method for the production of a gas consisting essentially of carbon monoxide and nitrogen. The use of normal combustion gases as the source of gas from which the final gas product is made eliminates the expensive and troublesome operation of a special burner to provide suitable combustion gases. The step of admixing carbon monoxide-bearing gas or equivalent gas with the combustion gases permits the use of combustion gases containing substantial and variable quantities of free oxygen without encountering the operating and maintenance difficulties which the presence of even a small amount of free oxygen otherwise causes.

We claim:

1. In the operation of a fuel-fired furnace for melting copper having a combustion chamber separated from a laboratory containing a bath of molten substantially oxygen-free copper and provided with a gaseous laboratory reducing atmosphere substantially free of any constituents capable under the operating conditions prevailing within the laboratory of deleteriously affecting the oxygen-free copper, the improvement which comprises providing the laboratory of the furnace with such a gaseous reducing atmosphere and consisting essentially of carbon monoxide and nitrogen by withdrawing from the combustion chamber a portion of the combustion gases composed of carbon dioxide, nitrogen, and impurities including oxygen, mixing with said gas a gas comprising carbon monoxide, heating the resulting gas mixture to convert the oxygen therein to carbon dioxide by reaction with the carbon monoxide, thereafter passing the gas in contact with carbon at an elevated temperature to reduce the carbon dioxide to carbon monoxide and to form a gas consisting essentially of carbon monoxide and nitrogen and substantially free of any constituents capable under the operating conditions prevailing within the laboratory of deleteriously affecting the oxygen-free copper contained therein, employing a minor portion of the gas thus produced as the carbon monoxide-bearing gas admixed with the combustion gases, and introducing a major portion of the gas thus produced into the laboratory of the furnace.

2. In the operation of a fuel-fired furnace for melting copper having a combustion chamber separated from a laboratory containing a bath of molten substantially oxygen-free copper and provided with a gaseous laboratory reducing atmosphere substantially free of any constituents capable under the operating conditions prevailing within the laboratory of deleteriously affecting the oxygen-free copper, the improvement which comprises providing the laboratory of the furnace with such a gaseous reducing atmosphere and consisting essentially of carbon monoxide and nitrogen by withdrawing from the combustion chamber a portion of the combustion gases composed of carbon dioxide, nitrogen and impurities including oxygen and water vapor, mixing with said gases a gas comprising carbon monoxide, treating the resulting gas mixture to remove water vapor therefrom, heating the dried gases to convert the oxygen therein to carbon dioxide by reaction with the carbon monoxide, thereafter passing the gas in contact with charcoal at an elevated temperature in a reduction chamber to reduce the carbon dioxide to carbon monoxide and to form a gas consisting essentially of carbon monoxide and nitrogen and substantially free of any constituents capable under the operating conditions prevailing within the laboratory of deleteriously affecting the oxygen-free copper contained therein, passing a minor portion of the hot gas from the reduction chamber in contact with charcoal about to be charged into the reduction chamber in order to dry such charcoal, employing the gas from the charcoal-drying operation as the carbon-monoxide-bearing gas mixed with the combustion gases, and introducing a major portion of the gas from the reduction chamber into the laboratory of the furnace.

3. In the operation of a fuel-fired furnace for melting copper having a combustion chamber separated from a laboratory containing a bath of molten substantially oxygen-free copper and provided with a gaseous laboratory reducing atmosphere substantially free of any constituents capable under the operating conditions prevailing within the laboratory of deleteriously affecting the oxygen-free copper, the improvement which comprises providing the laboratory of the furnace with such a gaseous reducing atmosphere and consisting essentially of carbon monoxide and nitrogen by withdrawing from the combustion chamber a portion of the combustion gases containing relatively large amounts of carbon dioxide and nitrogen and relatively small amounts of impurities such as sulphur dioxide, hydrogen sulphide, and water vapor, treating such withdrawn gas for the removal of the impurities and for conversion of the carbon dioxide therein to carbon monoxide to produce a gas consisting essentially of carbon monoxide and nitrogen and substantially free of any constitutents capable under the operating conditions prevailing within the laboratory of deleteriously affecting the oxygen-free copper contained therein, and introducing the gas thus produced into the laboratory of the furnace.

4. In the operation of a fuel-fired furnace for melting copper having a combustion chamber separated from a laboratory containing a bath of molten substantially oxygen-free copper and involving provision in the laboratory of a gaseous reducing atmosphere substantially free of any constituents capable under the operating conditions prevailing within the laboratory of deleteriously affecting the oxygen-free copper and consisting essentially of carbon monoxide and nitrogen, the improvement which comprises withdrawing a portion of the combustion gases from the combustion chamber, treating such withdrawn gas to remove impurities therefrom and to form a gas consisting essentially of carbon monoxide and nitrogen and substantially free of any constituents capable under the operating conditions prevailing within the laboratory of deleteriously affecting the oxygen-free copper contained therein, and introducing the gas thus formed into the furnace laboratory.

5. In an operation of the character described involving treatment of combustion gases composed of carbon dioxide, nitrogen, and impurities including oxygen to produce a gas consisting essentially of carbon monoxide and nitrogen, the improvement which comprises mixing a gas containing carbon monoxide with said combustion gases, heating the gas mixture to convert the oxygen therein to carbon dioxide by reaction with the admixed carbon monoxide, passing the resulting gas in contact with carbon to reduce the carbon dioxide to carbon monoxide, and employing a portion of the gas from said reduction operation as the carbon monoxide-bearing gas added to the combustion gas.

6. In an operation of the character described involving treatment of combustion gases composed of carbon dioxide, nitrogen, and impurities including oxygen to produce a gas consisting essentially of carbon monoxide and nitrogen by removing impurities from said combustion gases and reducing the carbon dioxide therein to carbon monoxide, the improvement which comprises admixing with the combustion gases prior to reduction of the carbon dioxide a gas comprising carbon monoxide, and heating the resulting gas mixture prior to such reduction to convert the oxygen therein to carbon dioxide.

7. The improvement according to claim 6, characterized in that a portion of the carbon monoxide-bearing gas from the carbon dioxide reduction operation is employed as the gas admixed with the combustion gases.

8. In an operation of the character described involving treatment of combustion gases composed of carbon dioxide, nitrogen and impurities including oxygen and water vapor to produce a gas consisting essentially of carbon monoxide and nitrogen, the improvement which comprises admixing with said combustion gases a gas comprising carbon monoxide, treating the gas mixture to remove water vapor therefrom, heating the gas mixture to convert the oxygen therein to carbon dioxide by reaction with the carbon monoxide, passing the resulting gas in contact with charcoal at an elevated temperature in a reduction chamber to convert the carbon dioxide to carbon monoxide, withdrawing for use a major portion of the gas passing from the reduction chamber, passing a minor portion of the hot gas from the reduction chamber in contact with charcoal about to be introduced into the reduction chamber in order to dry such charcoal, and employing the gas from said charcoal-drying step as the carbon monoxide-bearing gas admixed with combustion gas.

ROBERT A. GHELARDI.
PHILIP M. HULME.